United States Patent
Isukapalli et al.

(10) Patent No.: US 7,142,554 B1
(45) Date of Patent: Nov. 28, 2006

(54) VOICE OVER NETWORK LOOKUP METHOD AND APPARATUS

(75) Inventors: Sridhar G. Sharma Isukapalli, Fremont, CA (US); Gary Tsztoo, Saratoga, CA (US); Neal A. Schneider, Palo Alto, CA (US); Geeta Desai Cheunubhotla, San Jose, CA (US)

(73) Assignee: UTStarcom, Inc., Alameda, CA (US)

( * ) Notice: Subject to any disclaimer, the term of this patent is extended or adjusted under 35 U.S.C. 154(b) by 882 days.

(21) Appl. No.: 09/929,672

(22) Filed: Aug. 13, 2001

(51) Int. Cl.
*H04L 12/56* (2006.01)
(52) U.S. Cl. ...................................... 370/428; 370/473
(58) Field of Classification Search ................ 370/389, 370/412, 413, 465, 428, 429, 473, 474, 477
See application file for complete search history.

(56) References Cited

U.S. PATENT DOCUMENTS

| | | | |
|---|---|---|---|
| 4,156,112 A | 5/1979 | Moreland | |
| 4,534,024 A | 8/1985 | Maxemchuk et al. | |
| 4,771,425 A | 9/1988 | Baran et al. | |
| 5,345,445 A | 9/1994 | Hiller et al. | |
| 5,477,541 A | 12/1995 | White et al. | |
| 5,526,353 A | 6/1996 | Henley et al. | |
| 5,566,170 A | 10/1996 | Bakke et al. | |
| 5,684,954 A | 11/1997 | Kaiserswerth et al. | |
| 5,790,538 A | 8/1998 | Sugar | |
| 5,793,978 A | 8/1998 | Fowler | |
| 5,867,677 A | 2/1999 | Tsukamoto | |
| 6,157,653 A | 12/2000 | Kline et al. | |
| 6,208,662 B1 | 3/2001 | O'Neill et al. | |
| 6,215,685 B1 | 4/2001 | Fung et al. | |
| 6,243,667 B1 | 6/2001 | Kerr et al. | |
| 6,311,212 B1 | 10/2001 | Chong et al. | |
| 6,343,072 B1 | 1/2002 | Bechtolsheim et al. | |
| 6,633,563 B1 * | 10/2003 | Lin et al. | 370/389 |
| 6,804,237 B1 * | 10/2004 | Luo et al. | 370/392 |
| 2001/0030966 A1 | 10/2001 | Choi | |
| 2002/0038379 A1 | 3/2002 | Sato et al. | |

OTHER PUBLICATIONS

Hoshi et al. "Proposal of a Method of for Voice Stream Multiplexing for IP Telephony Systems". Feb. 18-20, 1999. IEEE. pp. 182-188.*

* cited by examiner

*Primary Examiner*—Derrick Ferris
(74) *Attorney, Agent, or Firm*—Felix L. Fischer (57) ABSTRACT

A system (100) for processing simplex and multiplexed voice packets transmitted over a network is disclosed. The system (100) may include a processor (102) and a compare section (104). A compare section (104) may include simplex entries (110-0) and multiplex entries (110-1). The compare section (104) can compare voice packet information with simplex entries (110-0) and multiplex entries (110-1) simultaneously to correlate voice packet data with a given voice channel.

20 Claims, 6 Drawing Sheets

VOICE OVER NETWORK LOOKUP METHOD AND APPARATUS

TECHNICAL FIELD

The present invention relates generally to systems for processing network voice data, and more particularly to systems that receive voice data in multiplex and simplex packet form.

BACKGROUND OF THE INVENTION

Conventionally, voice data remains separate from network data traffic. In particular, many enterprises will have a data network connecting a variety of workstations, and a separate voice system, such as a public branch exchange (PBX), for example. As data networks proliferate, it is becoming an increasingly desirable goal to integrate transmission of voice and data.

Transmitting data over voice systems can be inefficient, as such systems typically transmit voice and data at a synchronous rate. In synchronous systems, frames can be allocated portions of bandwidth, usually formed according to a time division multiplexing (TDM) scheme. Once a circuit is assigned, bandwidth for such a circuit may always be in use, and not available for other purposes.

Transmitting voice over a data network (voice over network) can provide advantages over other approaches. Voice over network can take advantage of existing network structures. Further, as noted above, networks (including the Internet) continue to grow in size and bandwidth. Voice over network can be more efficient than data over voice as such systems are typically packet based. In a packet based system, bandwidth is used as needed. When data is transmitted, a data packet is sent through the network. When voice is needed, a voice packet is transmitted through the network.

Voice over networks can provide additional cost savings as voice may be transmitted between locations without incurring conventional toll charges. This can be particularly true for systems that transmit voice over the Internet.

Many networks can be "connectionless" networks. Connectionless networks can provide multiple possible paths between source and destination. Consequently, voice transmitted over a connectionless network may be more reliable, as voice data can reach a destination even if some of the network nodes are not operational.

Voice over data networks may provide additional features in a cost-effective fashion. In a particular, transmitting voice over a data network may allow for "multicasting" of voice data (transmission of voice data to multiple destinations) and/or mixed media transmissions (voice and data) as but two examples.

One type of voice of network approach utilizes the Internet protocol (IP), and is often referred to as voice-over-IP (VoIP).

Data networks may take a variety of forms. As noted above, a data network may be a connectionless network, including the Internet. Further, a network may include portions that overlay and/or integrate connection-oriented legs. Such systems include IP over asynchronous transfer mode (ATM), IP switching, multiprotocol label switching (MPLS), or other similar packet switching approaches.

Various proposals for implementing voice over data networks have been proposed. One general approach is the idea of a network "gateway." A network gateway can provide access to a network (such as the Internet) for a variety of conventional voice data sources (voice channels). As but one example, a network gateway can be an IP gateway that integrates a PBX with an IP network. In such an arrangement, users may make telephone calls that appear entirely conventional, but are in fact being transmitted over a data network.

One drawback associated with voice over data networks can be latency. Latency is the delay introduced by the system into a voice transmission. Various sources may contribute to latency. A transmitting source introduces some delay in placing the voice into packet form (i.e., "packetization" delay). Typically the voice data can be encoded and then placed in packet form. Transmission of the voice over a data network can also introduce latency (i.e., "transmission" delay). Routing from node to node, or along a switching path, can consume additional time. Finally, a receiving destination can introduce delay. Upon receipt, voice data must be extracted from a packet and then transmitted along an appropriate voice channel.

Thus, decreasing latency can provide a valuable contribution to voice over data networking.

Figure 9:
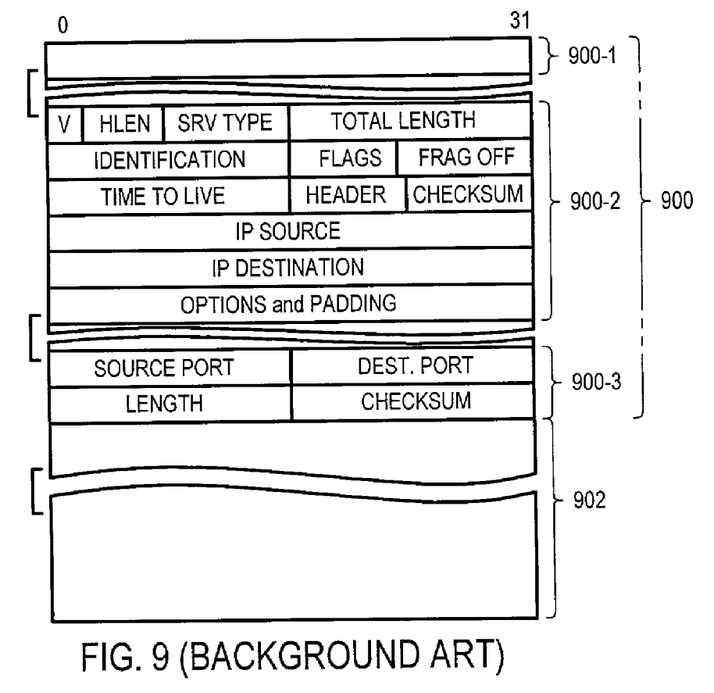
FIG. 9 is one example of a conventional IP packet.

Conventionally, a data network packet may include a "header" portion that may establish how a packet is transmitted and processed, and a payload portion that includes data. One example of a conventional packet is set forth in FIG. 9. FIG. 9 shows a packet having a header portion and a payload portion. A header 900 portion includes a data link layer header 900-1, an IP header 900-2, and a User Datagram Protocol (UDP) header 900-3. A payload portion 902 may be a UDP datagram that includes voice data.

A conventional network voice processing system can receive a voice data packet and then store the packet in a memory. The packet may then be processed by a processor according to a predetermined set of instructions. For example, various fields may be read by the processor, and according to criteria, the voice data may be forwarded and/or decoded. For example, voice data may be sent to another network endpoint (e.g., an IP endpoint) or sent to a synchronous system, such as a TDM network.

While conventional packet forwarding of voice a data network may provide adequate results, this may not always be the case. To help improve the processing of time dependent data, including voice data, a number of protocols have been proposed. One such protocol is the Real-Time Transport Protocol (RTP). An RTP header can provide sequence and timestamp information than may help assemble voice data once it has been received. Such information can account for out of sequence packets and/or varying packet transmission speeds.

Data for a given voice channel may be transported within its own packet. However, it may be possible to transport more than one voice channel in the same packet. This may be particularly applicable to IP gateways that can serve as a common destination for multiple voice channels. Various proposals have been set forth for including more than one voice channel in a data packet. Consequently, voice over data networks can include data packets for single voice channels ("simplex" voice packets) as well as data packets for multiple voice channels ("multiplexed" voice packets).

The need for processing both simplex and multiplex voice data packets may further contribute to overall packetization latency between a voice source and the resulting audio destination. Further, the processing of simplex and multiplexed voice data packets may add complexity to conventional systems that store the packet to memory and then deprocess the packet according to an instruction set. Such deprocessing of multiplexed voice packets includes extracting the various different voice channels included within a payload.

It would be desirable to arrive at a system that can improve the speed and efficiency at which simplex and multiplexed voice data packets are processed.

SUMMARY OF THE INVENTION

According to one embodiment of the present invention, a system may receive simplex voice packets and multiplexed voice packets. Information from simplex and multiplexed voice data packets may be applied to a compare section. A compare section may include a look-up type table that includes entries that index simplex and multiplexed voice data packets to particular voice channels.

According to one aspect of the embodiments, a compare section may include a content addressable memory (CAM). The CAM entries can include an entry type field that indicates which entries can match simplex voice packet information and which entries can match multiplexed voice packet information.

According to another aspect of the embodiments, simplex voice packet information that is applied to a compare section can include data from different packet header layers. More particularly, simplex voice packet information can include a user datagram protocol (UDP) destination port.

According to another aspect of the embodiments, simplex voice packet information can be stored in a register. A processor can access the register to apply the simplex voice packet information to the compare section.

According to another aspect of the embodiment, multiplexed voice packet information that is applied to a compare section can include voice channel information.

According to another aspect of the embodiments, simplex voice packet information can be compared to two look-up table entries while multiplexed voice packet information can be compared to single look-up table entries.

According to another aspect of the embodiments, matches in the compare section between simplex and/or multiplexed packet information can generate associated data. Such associated data can be used to determine a storage location for voice data of a corresponding voice channel According to another aspect of the embodiments, associated data provided by a compare section can include an address offset that is added to a base address to generate a memory location corresponding to a voice channel.

According to another aspect of the embodiments, associated data provided by a compare section can include a payload length value that indicates the size of a payload carried by a simplex or multiplexed voice data packet.

DETAILED DESCRIPTION OF THE EMBODIMENTS

Various embodiments of the present invention will now be described with reference to a number of diagrams. The embodiments include a system for providing rapid processing of simplex and multiplexed voice packets.

Figure 1:
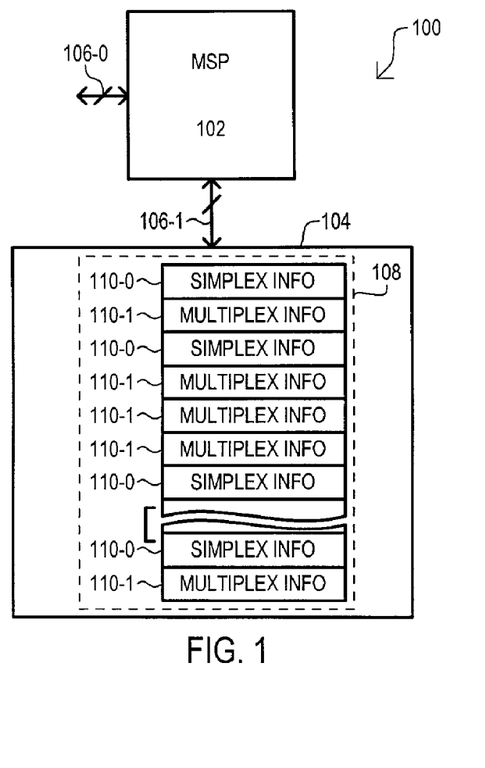
FIG. 1 is a block diagram of a first embodiment.

Referring now to FIG. 1 a first embodiment is set forth in a block diagram. A first embodiment includes a network voice processing system designated by the general reference character 100. The first embodiment 100 may include a processor 102 and a compare section 104. A processor 102 may receive voice data information by way of processor bus 106-0. As but one example, voice data information may be selected header fields from a voice data packet.

Voice information may be applied to a compare section 104. In the particular arrangement of FIG. 1, a processor 102 may apply voice data information by way of processor bus 106-1. Processor buses 106-0 and 106-1 may preferably be different buses, however, they may also be the same bus, or one bus may be a portion of the other bus.

A compare section 104 may include a look-up type table 108. A look-up type table 108 may include simplex entries 110-0 and multiplex entries 110-1. Simplex and multiplex entries (110-0 and 110-1) may store data that may indicate when voice data information corresponds to a particular voice channel. More particularly, a simplex entry 110-0 can map voice data information from a simplex voice packet to one voice channel. Similarly, a multiplex entry 110-1 can map voice data within a multiplexed voice packet to corresponding multiple voice channels.

In a preferred embodiment, a compare section 104 may include one or more content addressable memories (CAMs). Simplex and multiplex voice entries (110-0 and 110-1) can be CAM data entries, and a processor 102 can apply voice data information as one or more comparand values to the CAM.

Figure 2A:
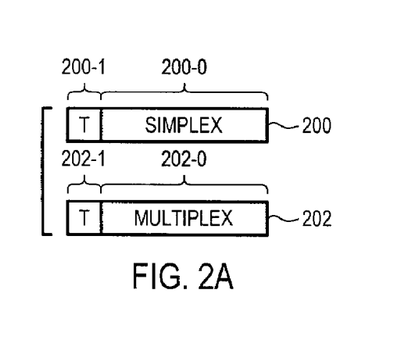
FIGS. 2A and 2B illustrate multiplex and simplex entries according to various embodiments.

FIGS. 2A and 2B are diagrammatic representations of simplex and multiplex entries according to various embodiments. FIG. 2A shows a simplex entry 200 that includes an identification (ID) field 200-0 and an entry type field 200-1. An ID field 200-0 may store data than can be compared with voice data information. In particular, a match between an ID field 200-0 and voice data information can indicate that a received packet is a simplex voice packet. Such a simplex voice packet may include a payload with voice data intended for a particular voice channel indicated by the ID field 200-0. As will be described at a later point herein, a match with an ID field 200-0 can generate associated data that may be used to forward a simplex voice data payload to a desired voice channel location.

In addition, or alternatively, associated data generated by a match may be used for other voice data applications, including state information for various channels. As but one example, associated data may indicate a location that may be updated to maintain a record of events for given voice channels (metrics) and/or maintain some record of channel state.

An entry type field 200-1 may have one value to indicate a simplex entry and another value to indicate a multiplex entry. Such an arrangement can prevent an erroneous match between an ID field 200-0 and voice data information that is not part of a simplex voice packet (for example, a multiplexed voice packet).

FIG. 2A also includes a multiplex entry 202. A multiplex entry 202 may includes an ID field 202-0 and an entry type field 202-1. An ID field 202-0 may store data than can be compared with voice data information. In particular, a match with an ID field 202-0 can indicate that a portion of a multiplexed voice packet payload includes voice data intended for a particular voice channel. As in the case of a simplex voice packet, a match with an ID field 202-0 may be used to generate associated data that can ensure a portion of a multiplexed voice data payload is forwarded to a correct channel location.

An entry type field 202-1 of a multiplex voice entry 202, like an entry type field 200-1 that of a simplex voice entry 200, may include data that to distinguish a multiplex voice packet from other types of a packets (such a simplex voice packets). Similarly, associated data of such an entry may be used to indicate the location of a value that may be updated in response to particular events in a voice channel (metrics) and/or maintain some record of channel state.

Figure 2B:
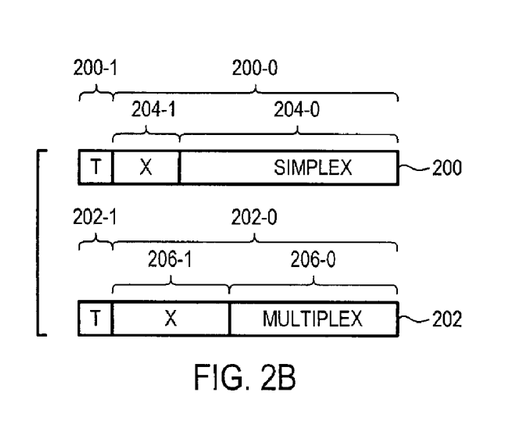

FIG. 2B shows a variation on simplex and multiplex entries. FIG. 2B may include the same general constituents as FIG. 2A. However, a simplex ID field 200-0 may include an ID portion 204-0 and a "don't care" portion 204-1. An ID portion 204-0 may include data that is utilized in a compare operation. A don't care portion 204-1 may be excluded from such a compare operation. In the arrangement of FIG. 2B, a multiplex ID field 202-0 may also include an ID portion 206-0 and a don't care portion 206-1. A simplex don't care portion 204-1 can be larger than, smaller than, or the same size as a multiplex don't care portion 206-1.

Various "don't care" portions of an entry may be masked. An entry may be masked by through a variety of ways. As but a few examples, processor may store, or access, a mask value. When a compare operation takes place, the processor can use the mask value, or supply the mask value to compare circuits. Such a mask value can be a "global" mask value for all entries in a look-up type table. In other approaches, simplex and multiplex entries (200 and 202) may be entries in a CAM. A ternary CAM may include mask bits corresponding to each data bit, allowing a comparison operation between a comparand bit and a data bit to indicate a match even if the two values are different. Specialized binary CAM may be capable of global mask capabilities as well. Yet another approach can include setting don't care portions to predetermined values, and then setting corresponding comparand portions to the same predetermined value.

Masking may thus be "global" or "local." A ternary CAM can be "local" masking arrangement as a mask entry could be provided for each voice entry (simplex or multiplex). However, in the event all simplex entries are uniform (have fields of the same size in the same locations), a global masking scheme may be more efficient. More particularly, for entries such as those shown in FIG. 2B, one global mask could be used for all simplex voice entries (200) to mask out "don't care" portions (204-1) on all such entries. Similarly, one global mask could be used for all multiplex entries (202) to mask out "don't care" portions (206-1) on all such entries. Of course, there can be multiple mask entries for simplex and/or multiplex entries.

While the examples of FIG. 2B shows basically three fields in each entry (entry type, don't care, and ID portion), it is understood that such entries could include one or more additional fields. As but one example, an additional field could include a valid bit and/or an "other bit". A valid bit can indicate if an entry contains valid data or not. An other bit may be used for various other purposes.

Various types of values may be included in simplex and multiplex voice entries (200 and 202). For example, an ID portion 204-0 of simplex voice entry 200 may include data corresponding to one or more network layers. More particularly, a simplex voice entry 200 may include a data corresponding to a transport layer. As one very particular example, a data portion 204-0 may include a user datagram protocol (UDP) destination port.

A data portion 206-0 of multiplex voice entry 202 may include data corresponding to a particular channel. As one very particular example, a data portion 206-0 may include a trunk identification value (TRUNK ID) and a channel identification (CID).

Figure 3:
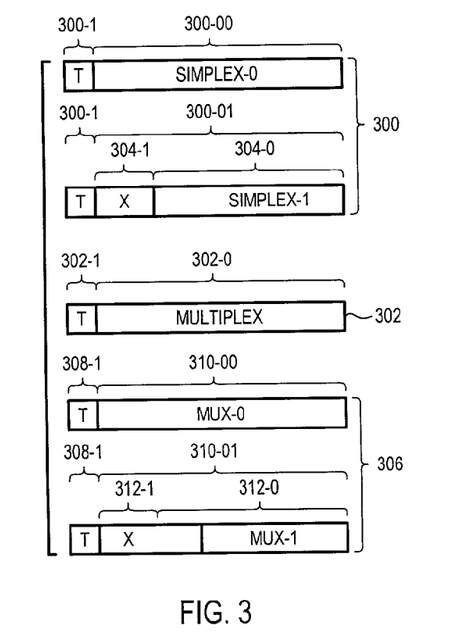
FIG. 3 illustrates multiplex and simplex entries according to other embodiments.

Referring now to FIG. 3, a diagrammatic representation of simplex and multiplex voice entries according to another embodiment is shown.

Referring back to FIGS. 2A and 2B, it is noted that disparities in the sizes of the simplex entry ID portion 204-0 and the multiplex entry data portion 206-0 can result in large "don't care" portions (204-1 and 206-1). Such an arrangement can be inefficient in terms of look-up table entry space usage. As but one example, if a content addressable memory (CAM) is included in a compare section, CAM width entries may limit available entry widths. FIG. 3 shows a more efficient approach when such disparities in size exist.

FIG. 3 shows a simplex voice entry 300, a first multiplex voice entry 302, and a second multiplex voice entry 306. A simplex voice entry 300 may be distributed across more than two look-up table locations (i.e., may "straddle" multiple look-up table entries). Consequently, a simplex voice entry 300 may include a first ID field portion 300-00 at a first location, and a second ID field portion 300-01 at a second location. In addition, both locations include an entry type field 300-1. In contrast, in the example shown, a first multiplex voice entry 302 may be stored at a single location. A first multiplex voice entry 302 may include an ID field 302-0 and an entry type field 302-1. Of course, if needed, multiplex entries may also straddle multiple table entries. Such an example is shown as second multiplex voice entry 306.

A second multiplex voice entry 306 may be distributed across more than two look-up table locations. Consequently, a second multiplex voice entry 306 may include a first ID field portion 310-00 at a first location, and a second ID field portion 310-01 at a second location. In addition, both locations include an entry type field 308-1.

In the particular examples of entries that are distributed across multiple look-up locations (300 and 306), all information in a first ID field portion (300-00 and 310-00) can fill the available location, and thus does not include a "don't care" portion. However, a portion of the second ID field portion (300-01 and 310-01) can be excluded from a compare operation. Consequently, second ID field portion (300-01 and 310-01) can include an ID portion (304-0 and 312-0) and a don't care portion (304-1 and 312-1).

In an arrangement such as that shown in FIG. 3, a compare operation can vary according to particular voice data packet type. In the case of entries that occupy single lookup locations (302), a lookup table, such as a content addressable memory (CAM), or the like, can be configured to compare a data value to an ID field (such as 302-0) of single lookup entries. In contrast, for entries that occupy multiple lookup locations (300 and 306), a lookup table can be configured to compare a data value to ID fields (such as 300-00/304-0 or 310-00/312-0) of multiple lookup entries.

Entries such as those shown in FIG. 3 may be masked by through a variety of ways, including those particular method discussed in conjunction with FIG. 2B. Further, as noted in conjunction with FIG. 2B, simplex and/or multiplex entries (300 and 302) may also include an additional field, such as a valid bit and/or other bit.

Still further, it is noted that while examples of a entries that occupy two lookup locations have been described, it would be obvious that even larger entries can span more than two lookup locations.

Having described more particular examples of simplex and multiplex voice entries, a more detailed description of a voice packet processing system will now be described with reference to FIG. 4.

Figure 4:
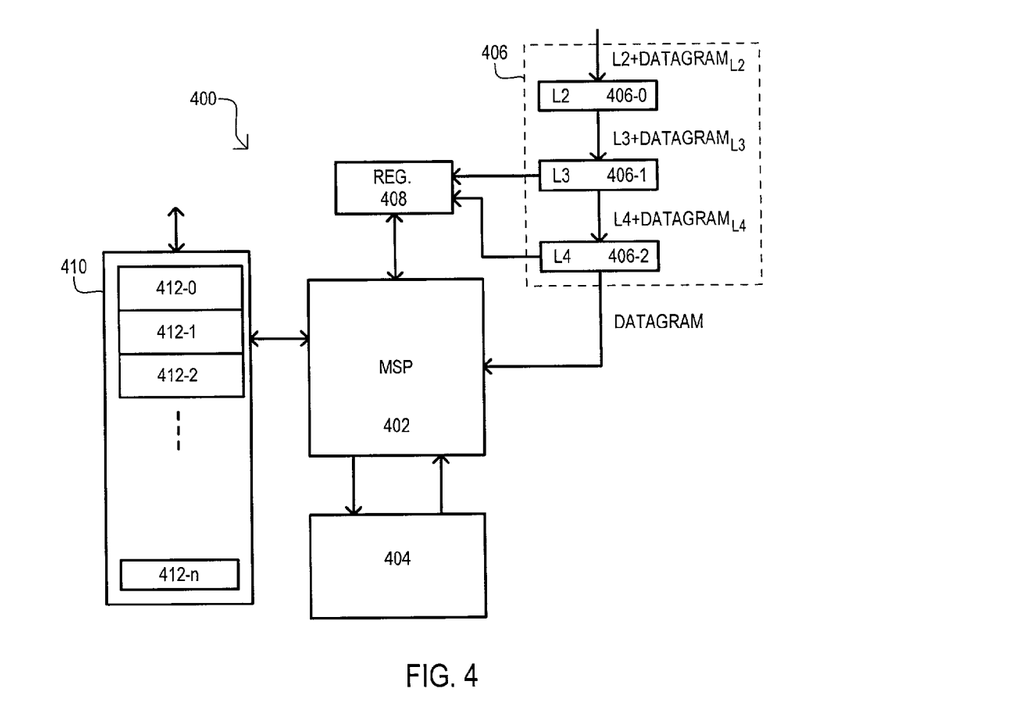
FIG. 4 is a block diagram of a second embodiment.

FIG. 4 shows a system according to a second embodiment. The second embodiment is designated by the general reference character 400, and is shown to include a processor 402 and a compare portion 404. In the particular example of FIG. 4, the compare portion 404 includes a CAM.

The second embodiment 400 may further include a packet processing pipeline 406. A packet processing pipeline 406 may remove various portions of a packet header. More particularly, a packet processing pipeline 406 may sequentially extract header information for the various network layers.

The particular packet processing pipeline 406 includes a first section 406-0, a second section 406-1, and a third section 406-2. Further, the various sections (406-0 to 406-2) remove (or "strip") header information and pass on the reduced packet (i.e., the packet with a portion of its header removed) to the next section. The operation of one particular packet processing pipeline will be described in more detail below.

The second embodiment 400 is shown to further include a packet information register 408 and a packet buffer memory 410. A packet information register 408 may store packet information provided by a packet processing pipeline 406. A packet buffer memory 410 can store voice data payloads from voice data packets in particular locations corresponding to the voice channel. Thus, the particular packet buffer memory 410 of FIG. 4 is shown to include various channel memory sections 412-0 to 412-n.

Having described the general arrangement of a second embodiment 400, the operation of the second embodiment 400 will now be described with reference to FIG. 5.

Figure 5:
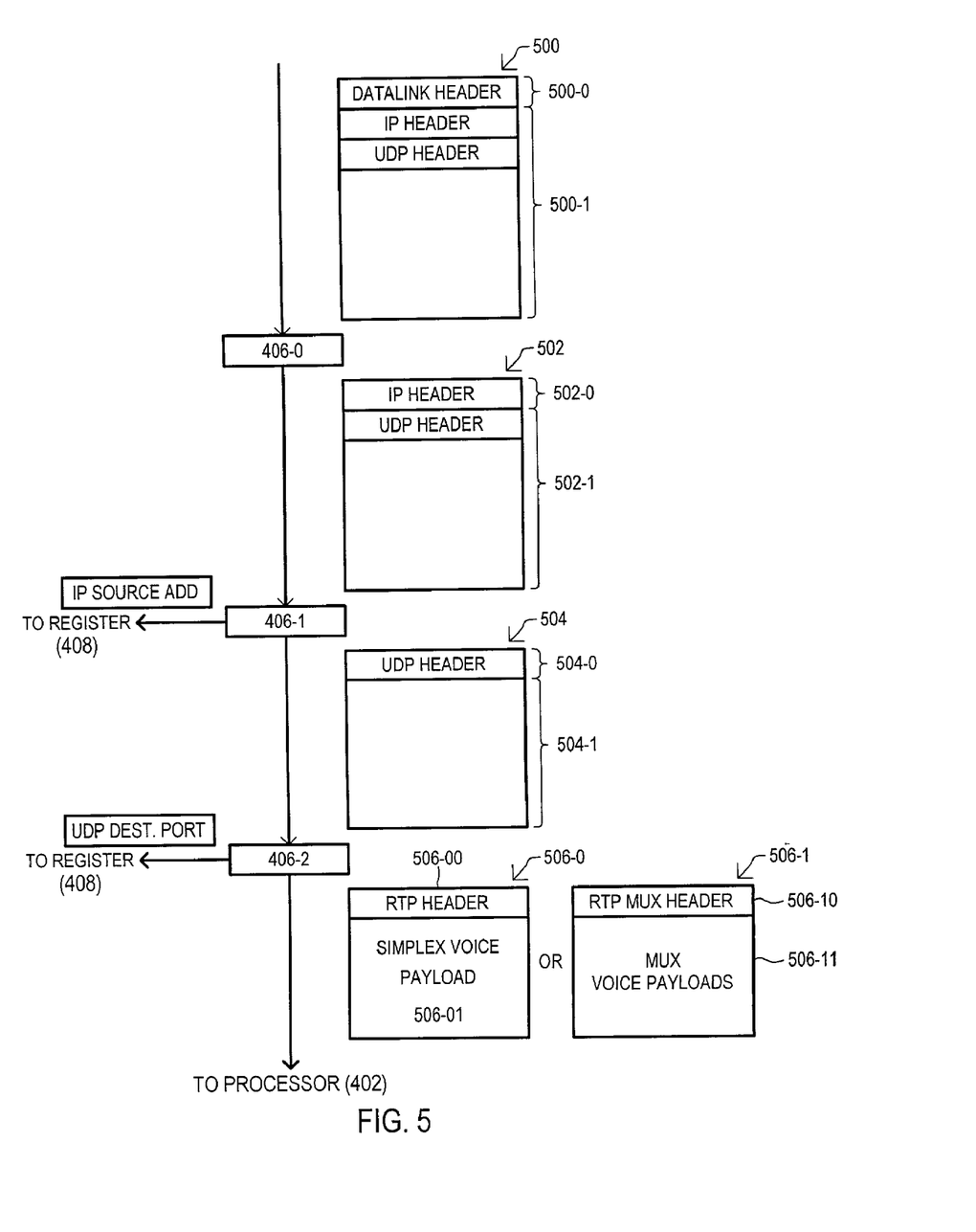
FIG. 5 is a diagram illustrating a first portion of a voice packet processing approach according to one embodiment.

FIG. 5 is a diagrammatic representation of a first part of a packet processing procedure for simplex and multiplexed voice data packets.

The example illustrates a particular set of protocols: IP, UDP and the real-time transport protocol (RTP). However, while such a set of protocols can be advantageously implemented with existing network systems, such a particular set of protocols should not be construed as limiting the invention thereto.

Referring now to FIG. 5 in conjunction with FIG. 4, a packet having a first form 500 may arrive at first section 406-0. The first form 500 may include a layer 2 header (DATALINK HEADER) 500-0 and a corresponding layer 2 payload (or datagram) 500-1. A first section 406-0 may remove the DATALINK HEADER 500-0 to form a packet having a second form 502 that is forwarded to the second section 406-1.

A second form 502 may include a layer 3 header (IP HEADER) 502-0 and corresponding layer 3 payload (or datagram) 502-1. A second section 406-1 may remove the IP HEADER 502-0 to form a packet having a third form 504 that is forwarded to the third section 406-2. The second section 406-1 may forward all, or a portion of the IP HEADER 502-0 to packet information register 408. In the particular example of FIG. 5, the IP source address from the IP HEADER 502-0 is forwarded to the packet information register 408.

The third form 504 may include a layer 4 header (UDP HEADER) 504-0 and corresponding layer 4 payload (or datagram) 504-1. A third section 406-2 may remove the UDP HEADER 504-0 to form a packet having various fourth forms 506-0 or 506-1. The fourth form packets (506-0 or 506-1) can be forwarded for use by the processor 402. The third section 406-2 may forward all, or a portion of the UDP HEADER 504-0 to packet information register 408. In the particular example of FIG. 5, the UDP destination port of the UDP HEADER 504-0 is forwarded to the packet information register 408.

A fourth form packet (506-0 and 506-1) can vary according to particular voice packet type. In the event the voice packet is a simplex voice packet, a fourth form packet 506-0 could include a Real-time Transport Protocol (RTP) header 506-00 and a simplex voice payload 506-01. In the event the voice packet is a multiplex voice packet, a fourth form packet 506-1, and include a Real-time Transport Protocol Multiplex (RTP MUX) header 506-10 and multiplexed voice payloads 506-11.

Figure 6A:
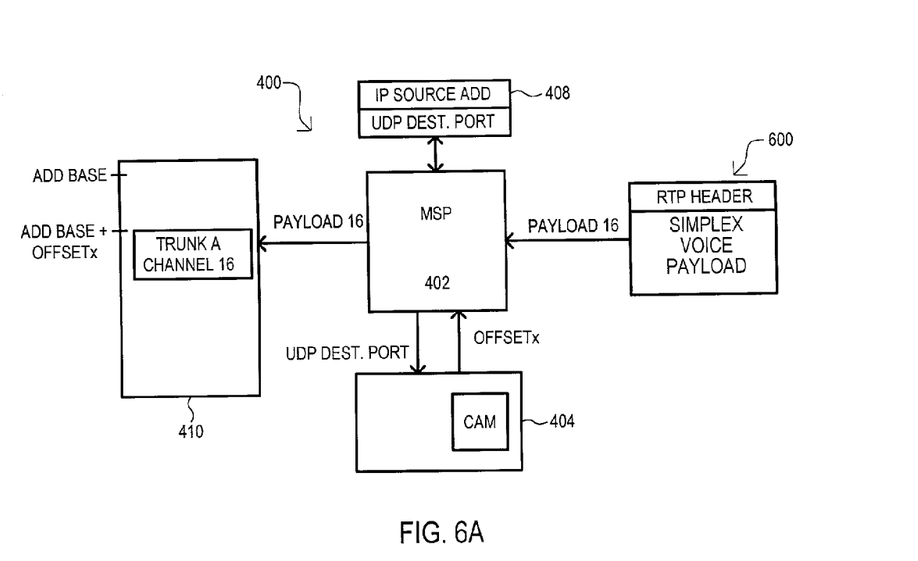
FIGS. 6A and 6B are diagrams illustrating a second portion of a voice packet processing approach according to an embodiment.

A second part of a packet processing procedure for simplex and multiplexed voice data packets will now be described with reference to FIGS. 6A and 6B. FIG. 6A shows the processing of a simplex voice packet. According to FIG. 6A, a processor 402 may apply multiple packet layer information from register 408 to a compare section 404. As but one particular example, a UDP destination port number can be applied to a CAM in compare section 404.

Compare section 404 may include a look-up type data structures that include simplex voice entries such as those described in conjunction with FIGS. 2A to 2C and 3. In addition, a compare section 404 can include, or index to, associated data for each such entry. Such associated data is provided in the event a value applied by processor 402 matches an entry. In the example of FIG. 6A, a match produces address information that can point to a particular location and/or range of locations within packet buffer memory 410. More particularly, a match can generate an offset value OFFSETx. An offset value (OFFSETx) can be added to a base address value (ADDBASE) to index to a particular location corresponding to the voice channel of the simplex voice packet.

Processor 402 may then write the simplex voice payload 600 to the particular indicated location in packet buffer memory 410.

Figure 6B:
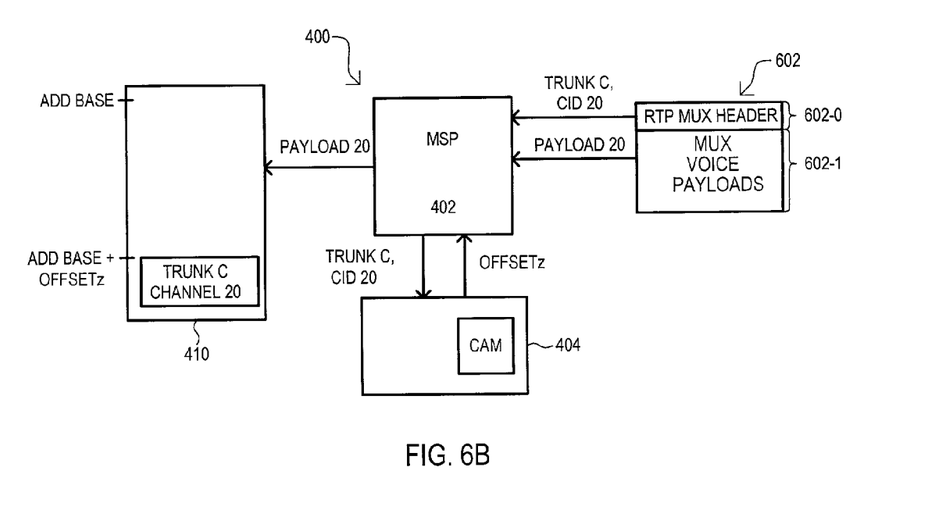

FIG. 6B shows the processing of a multiplexed voice packet. According to FIG. 6B, a processor 402 may apply channel identifying information (for multiple voice channels contained in a multiplexed voice packet 602) to a compare section 404. As but one particular example, a trunk IDs and a channel IDs (CID) from an RTP MUX header 602-0 can be applied to compare section 404.

Compare section 404 may include a look-up type data structures that include multiplexed entries such as those described in conjunction with FIGS. 2A to 2C and 3. As in the case of simplex voice entries, compare section 404 can provide associated data for each multiplex entry. In the example of FIG. 6B, the application of a trunk ID "C" and a channel ID "20" a produces address information for packet buffer memory 410. More particularly, a match can generate an offset value OFFSETz. An offset value (OFFSETz) can be added to a base address value (ADDBASE) to index to a particular location corresponding to the one particular voice channel (Trunk ID=C, Channel ID=20) within the multiplexed voice packet 602.

Processor 402 may then write the voice payload for the particular channel (PAYLOAD 20) to the particular indicated location in packet buffer memory 410. Such a voice payload may be one of many voice payloads from RTP payloads 602-1. The process may then be repeated for each voice channel of the multiplexed voice packet 602.

Figure 7:
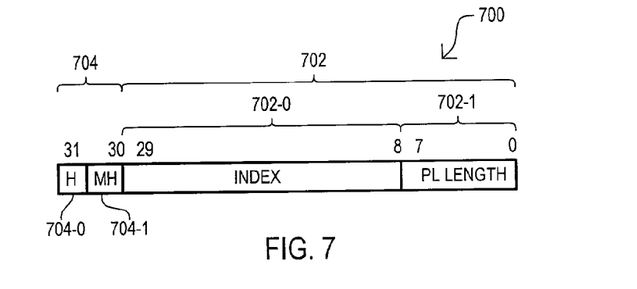
FIG. 7 illustrates an associated data value format according to one particular embodiment.

Referring now to FIG. 7, one particular associated data format is shown. The associated data 700 may include and index field 702 and a match field 704. An index field 702 can contain information for forwarding voice data to a particular location. In the specific example of FIG. 7, index field 702 can include an index value 702-0, which can be an address offset value, as but one example, and a payload length value 702-1. Thus, a processor 402 could generate a pointer using a base address and an offset address, and then write the payload length value to the resulting address location.

A match field 704 may include a match indicator 704-0 and a multiple match indicator 704-1. A match indicator 704-0 can indicate that the resulting associated data was generated from a match with a simplex or multiplexed voice data packet. A multiple match indicator 704-1 can indicate an erroneous condition where two entries in a compare section 404 are generating matches for the same applied values. Such a feature may be particularly advantageous when a compare section 404 includes a CAM.

Figure 8:
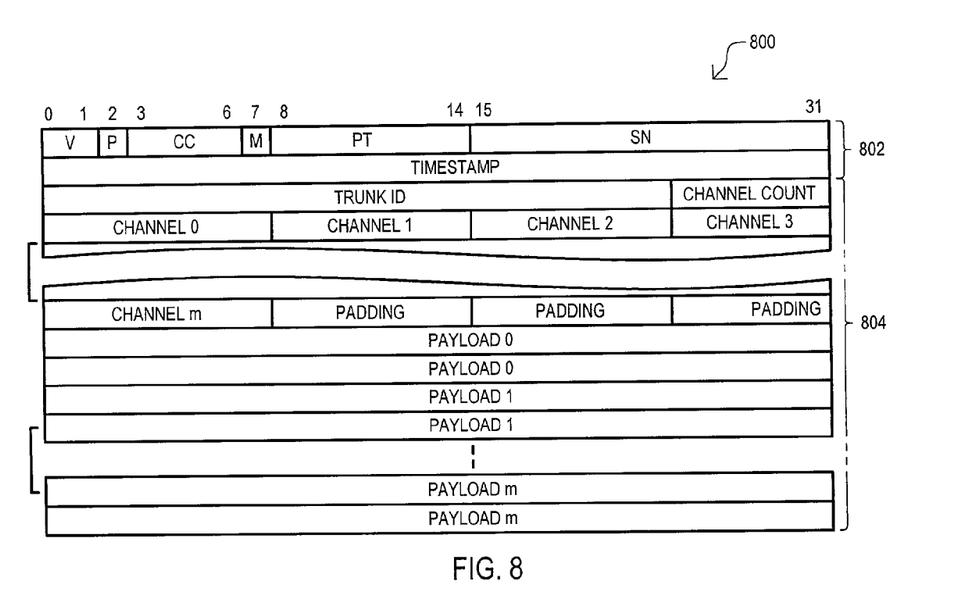
FIG. 8 is a diagram of a multiplexed voice packet format according to one arrangement.

FIG. 8 shows one example of a possible multiplexed data packet format. Such a data packet may be transmitted across a network as a UDP datagram, for example. Further, such a data packet may be particularly suited to the voice packet processing systems and methods set forth above.

The multiplexed (mux) packet of FIG. 8 is designated by the general reference character 800 and is arranged according to the RTP protocol. The particular mux packet 800 may include various fields aligned along 32-bit boundaries. However, such a particular arrangement should not construed as limiting the invention.

The mux packet 800 can be conceptualized as including a RTP portion 802 and a subsequent voice portion 804. A RTP portion 802 may include various fields according to Request for Comments (RFC): 1889, "RTP: A Transport Protocol for Real-Time Applications", Feb. 22, 2001. Thus, the RTP portion 802 may include a version field "V." A version field may indicate a particular protocol version. A "P" field may be a flag that indicates a header may include padding. An "X" field can be a flag that indicates an extended header size. A "CC" field can be a contributing source identifier count. As is well known, a voice packet payload may include multiple sources (by way of a mixer, or the like). The CC field can indicate how many contributing sources are included. A "M" field can be a marker whose purpose is dependent upon a particular application. A "PT" field can indicate a payload type. Payload types may indicate a particular encoding technique. Such encoding techniques can include the various audio encoding techniques promulgated by the International Telecommunication Union (ITU), including, but of course not limited to, "G.721," "G.723," LPC, "G.722" and "G.728." A "SN" field can indicate a sequence number. Sequence numbers can be used to detect out of sequence packets. A "TIMESTAMP" can be used to compensate for "jitter" between voice samples.

A voice portion 804 can allow for rapid processing of multiplexed voice data payloads. In the particular arrangement of FIG. 8, a voice portion 804 may include a "TRUNK ID" field. A TRUNK ID field can represent a physical arrangement voice channel destinations (such as an analog trunk), a logical arrangement of voice channels, or some combination thereof. A "CHANNEL COUNT" field can indicate how may channel payloads are contained within the particular mux packet 800. Following a CHANNEL COUNT, a series of CHANNEL ID values can be provided. As noted above, a TRUNK ID along with a CHANNEL ID can indicate a particular voice channel. In the particular arrangement of FIG. 8, CHANNEL IDs are followed PADDING values. Padding can be advantageous in block manipulations, such as encoding, or the like. Following the various padding values (or CHANNEL ID values if such values align along the 32-bit boundary) can be the payload for the various channels.

An arrangement such as that set forth in FIG. 8 can be advantageous as a processor or the like can read TRUNK ID and CHANNEL COUNT values. With the CHANNEL COUNT value known, the processor can then step across the header, reading each CHANNEL ID. Each CHANNEL ID can be combined with a TRUNK ID and applied to a compare circuit. If the compare circuit includes the unique look-up entries described, voice packet data can be rapidly forwarded to a desired channel location.

Various embodiments have been described that include a system having a compare section that may identify both simplex and multiplexed voice data packet. In particular, a compare section may include a CAM having globally maskable portions. Even more particularly, a CAM may include simplex entries that compare an IP source address and UDP destination port to arrive at a voice channel, and multiplex entries that compare a trunk ID and channel ID to arrive at a voice channel. Such an arrangement may advantageously process both simplex and multiplexed voice packets in a rapid fashion.

It is understood that while particular entry formats, packet formats, and protocols have been described, alternate embodiments may employ different formats and protocols. Still further, while particular functions of the various systems may be fastest if implemented in a hardware, such functions could be implemented by a processor or the like executing a sequence of instructions.

Accordingly, it is understood that while various embodiments have been described in detail, the present invention could be subject to various changes, substitutions, and alterations without departing from the spirit and scope of the invention. Accordingly, the present invention is intended to be limited only as defined by the appended claims.

What is claimed is:

1. A system for processing simplex and multiplexed voice packets, comprising:
   means for voice packet input;
   a compare circuit connected to the input means that includes a plurality of locations that include simplex entries and multiplex entries, each simplex entry including data that can match simplex packet information and indicia for identifying a simplex entry, each multiplex entry including data that can match multiplex packet information and indicia for identifying a multiplex entry.

2. The system of claim 1, wherein:
   each simplex entry includes data that can match predetermined simplex packet header information.

3. The system of claim 1, wherein:
   each simplex entry includes data that can match information corresponding to at least one network layer.

4. The system of claim 1, wherein:

each simplex entry includes data that can match a user datagram protocol destination port address.

5. The system of claim 1, wherein:

each simplex and multiplex entry includes an entry type field having a first value in a simplex entry and a second value different from the first value in a multiplex entry.

6. The system of claim 1, wherein:

the compare circuit includes a content addressable memory (CAM).

7. The system of claim 6, wherein:

the CAM includes maskable entries.

8. The system of claim 7, wherein:

the CAM entries are globally maskable.

9. A packet processing system, comprising:

means for voice packet input;

a compare section connected to the input means having a content addressable memory (CAM) that includes a plurality of entries that match simplex voice packet information and multiplexed voice packet information each entry including at least one bit that indicates if the entry matches simplex voice packet information or multiplexed voice packet information.

10. The packet processing system of claim 9, wherein:

each entry that matches multiplexed voice packet information includes a field that stores a voice channel value.

11. The packet processing system of claim 10, wherein:

each entry that matches multiplexed voice packet information further includes a trunk field that stores a data value corresponding to a grouping of voice channels.

12. The packet processing system of claim 9, wherein:

each entry that matches simplex voice packet information includes a field that stores a voice channel value.

13. The packet processing system of claim 9, wherein:

each entry that matches simplex voice packet information includes a field that matches transport layer header information.

14. A system, comprising:

a processor;

a storage register coupled to the processor that stores simplex voice packet information;

a voice packet input coupled to the processor that provides multiplexed voice packet information; and a compare circuit coupled to the processor that compares simplex voice packet information from the storage register and multiplexed voice packet information from the voice packet input to a plurality of entries, each entry indexing to a particular voice channel.

15. The system of claim 14, wherein:

the compare circuit includes a content addressable memory (CAM).

16. The system of claim 15, wherein:

each CAM entry includes at least one entry type field for distinguishing between entries that match simplex voice packet information and entries that match multiplexed voice packet information.

17. The system of claim 16, wherein:

each entry indexes address information for a storage location corresponding to a voice channel.

18. The system of claim 14, wherein:

the compare circuit entries each include valid indications that indicate when an entry contains valid information.

19. The system of claim 14, wherein:

the compare circuit compares simplex voice information with multiple entries.

20. The system of claim 14, wherein:

the compare circuit compares multiplex voice information with multiple entries.

* * * * *